United States Patent [19]

Van Huis

[11] 4,043,256

[45] Aug. 23, 1977

[54] ANIMAL ENCLOSURE WITH PRESSURE CONTROLLED VENTILATION INLET AND DEFLECTION MEANS

[75] Inventor: Robert L. Van Huis, Zeeland, Mich.

[73] Assignee: U.S. Industries, Inc., Zeeland, Mich.

[21] Appl. No.: 621,675

[22] Filed: Oct. 14, 1975

Related U.S. Application Data

[60] Division of Ser. No. 449,625, March 11, 1974, Pat. No. 3,938,428, which is a continuation-in-part of Ser. No. 308,692, Nov. 22, 1972, Pat. No. 3,808,960.

[51] Int. Cl.² .............................................. F24F 11/04
[52] U.S. Cl. ....................................... 98/1.5; 98/33 R
[58] Field of Search .............. 98/1, 5, 41, 33 R, 43 R, 98/40 D, 40 C; 119/16, 21

[56] References Cited

U.S. PATENT DOCUMENTS

| 2,456,489 | 12/1948 | Burkholder, Jr. ............... 236/49 X |
| 3,601,030 | 8/1971 | Bryant ...................................... 98/32 |
| 3,601,096 | 8/1971 | Rutherford ............................ 119/16 |
| 3,611,906 | 10/1971 | Lorenz ................................ 98/33 R |
| 3,677,229 | 7/1972 | Blough et al. ........................ 119/16 |
| 3,706,271 | 12/1972 | Mieczkowski ..................... 98/33 R |
| 3,762,301 | 10/1973 | Gilbert ................................. 98/40 C |

FOREIGN PATENT DOCUMENTS 1,226,212   3/1971   United Kingdom ............... 98/33 R Primary Examiner—William E. Wayner
Attorney, Agent, or Firm—Price, Heneveld, Huizenga & Cooper

[57] ABSTRACT

Proper ventilation is achieved by exhaust fans which draw fresh air into the building through an inlet duct. The inlet opening is adjustable by a valve movable between generally open and closed positions and a movable deflector controls the direction of flow in accordance with the rate of flow to achieve even circulation. The valve and deflector position are controlled by an actuator responsive to the pressure differential between the inside and outside of the building. Preferably, the inlet opening is a longitudinal slot extending the length of the building along each side at the ceiling and the exhaust fans are positioned at the floor. Preferably, a louver in front of the opening controls the effective size of the opening and the deflection angle of flow into the building.

8 Claims, 10 Drawing Figures

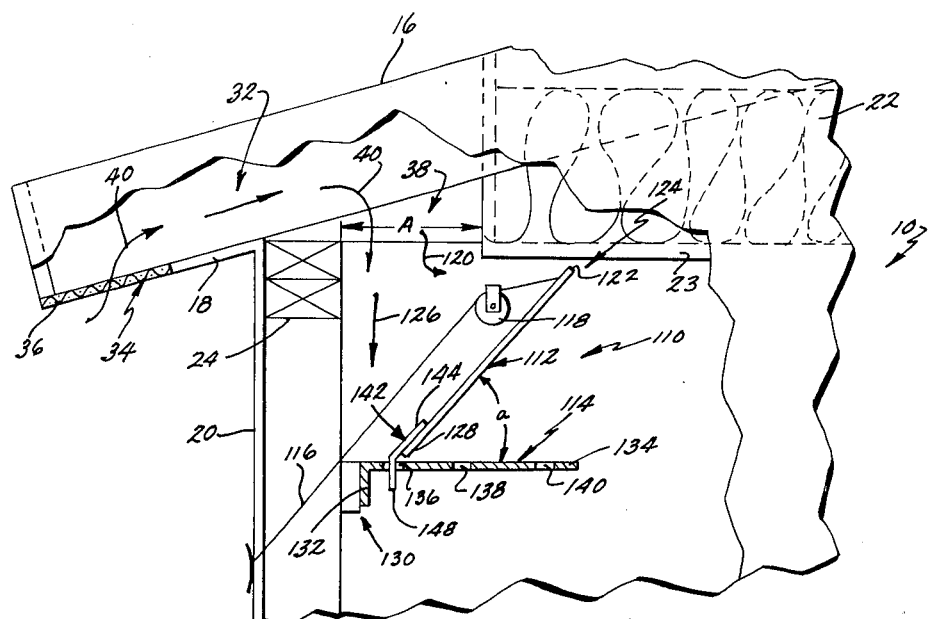
FIG. 4.
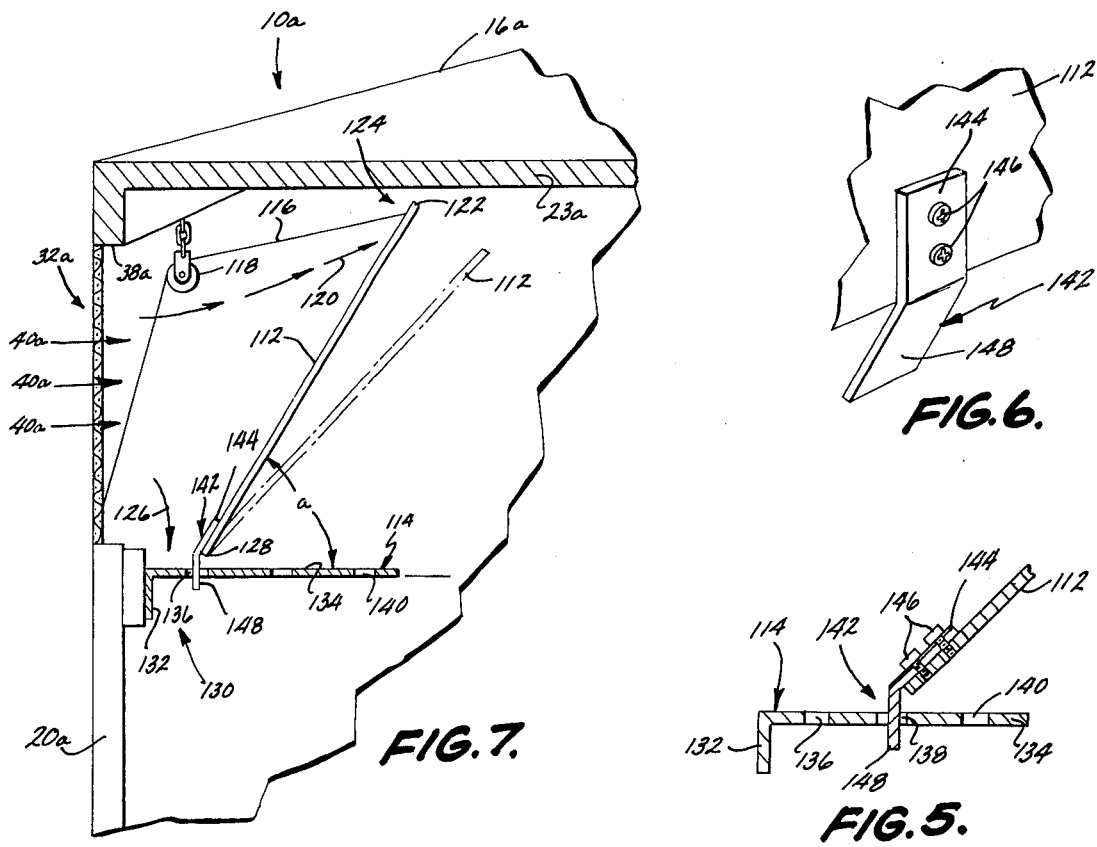
FIG. 7.
FIG. 6.
FIG. 5.

ANIMAL ENCLOSURE WITH PRESSURE CONTROLLED VENTILATION INLET AND DEFLECTION MEANS

This application is a division of Ser. No. 449,625, filed Mar. 11, 1974, now U.S. Pat. No. 3,938,428; and Ser. No. 449,625 is a continuation-in-part of Ser. No. 308,692, filed Nov. 22, 1972, now U.S. Pat. No. 3,808,960.

BACKGROUND OF THE INVENTION

A marked improvement in the production and growth rates of confined poultry or other livestock is noted if the confinement houses are regularly and evenly ventilated. As a result, the practice of providing some means of regulating the flow of air into and out of a confinement house has been widely adopted for some time. In accordance with the prior art known to Applicant, exhaust fans or the like are actuated in response to a temperature sensing apparatus which turn the fans on when a preselected temperature is reached. The exhausted air is replaced through various inlet arrangements generally positioned along the upper margin of the confinement house so that the fresh air flowing in is drawn downwardly over the livestock confined therein for exhaust beneath or along the lower margin of the building.

A principal disadvantage with present arrangements is the lack of a simple and yet meaningful control over the air inlet mechanism. At each level or rate of exhaust, there is a corresponding optimum inlet opening to provide the proper balance for replacement air. If the opening is larger than required, insufficient mixing is achieved. That is, the movement of the incoming air will be insufficient to reach the innermost and lowermost extremities of the building therefore causing an overcooling with respect to the livestock near the inlet ducts and insufficient cooling or ventilation with respect to the livestock removed from the inlet ducts. On the other hand, if the inlet opening is too small, the pressure differential across the inlet opening caused by the exhaust fans result in the inlet air flowing at a higher velocity than is desired. Thus, the distribution of fresh air into the confinement house is many times uneven and therefore results in the development of stagnant areas which are never properly ventilated.

One approach taught by the prior art is to vary the rate of flow by varying the inlet opening so that a given differential in air pressure between the interior of the building and atmosphere is automatically manitained throughout variations in air discharge rate. While this is desirous, it does not assure efficient and even ventilation since the inlet configuration will develop different stratifications and zones of air movement or even dead zones depending on the rate and volume of air flow. For example, air being sucked into a building through a window diffuses in all directions at approximately an 11° angle losing most of its speed whereupon it is drawn directly to the fan leaving large areas within the building unventilated. By positioning the inlet opening at the ceiling, the rate of flow through the opening will maintain its speed longer because it is only diffusing in three directions (down, to the right and left) instead of four. It will still however develop undesirable zones of unventilated air space within the building.

Uneven distribution of fresh air results in an inconsistent production or growth rate by the livestock. Of equal importance, the inefficiencies resulting from the inaccuracies provided by present proposals has in many instances required utilization of more and heavier duty exhaust fans than would be required if the replacement air were properly and evenly distributed. This results in higher overall costs in the systems which costs are not negligible. Thus, there is a need in this art for a ventilation system which provides an easier and simple means which more efficiently distributes and mixes the fresh air flowing through the air inlet to prevent uneven distribution of the fresh air.

SUMMARY OF THE INVENTION

The ventilation of livestock confinement houses in general is achieved by providing one or more exhaust fans to withdraw air at varying rates in response to temperature changes and draw fresh air in from without the building through inlet ducts. Where the livestock is poultry, a particular arrangement is to elevate the poultry above the floor of the building and position the exhaust fans beneath the poultry with the air inlet ducts positioned above the poultry. This type of system is designed to withdraw stale air below the poultry where dung discharge devices are usually arranged while at the same time bringing fresh replacement air from above. Other types of arrangements can be utilized however and the poultry or livestock are not always elevated above the floor.

In accordance with the invention, a valve means is positioned in association with the air inlet duct and movable between a range of positions between a fully opened and fully closed position. Deflection means are also provided in association with the inlet duct and adjustable to control flow direction in association with rate of flow to provide a consistent even flow distribution throughout the building. Pressure sensitive actuator means automatically adjust the inlet opening and deflection means to maintain a generally consistent pressure differential between the interior and ambient building pressure.

In the preferred embodiment of the invention, the inlet duct includes a slot extending the length of the building on each side along the ceiling. A louver is positioned in front of the slot and movable to vary the inlet opening from the slot as well as the angle of inclination to deflect flow into the building as desired. The louver preferably is pivotally mounted along its lower margin to the wall of the building and the actuator means includes a cable arrangement which actuates movement of the louver into its desired position. Depending on the rate of flow, the angle of deflection is adjusted to achieve maximum and even penetration of fresh air throughout the building. The louver may be adjustable relative the wall to provide an arbitrary down-wash opening as well.

The automatic control of the inlet opening and angle of deflection of the air entering through the opening provides the first known complete control of inlet air and circulation thereof within measurable limits. By preselecting an arbitrary pressure differential, the inlet opening will automatically vary in accordance with the exhaust demand. Further, by automatically preselecting a corresponding angle of deflection of the air coming through the opening, consistent ventilation circulation is achieved. Significant cost reductions are achieved since operator monitoring is eliminated. In addition, maximum efficient utilization of the equipment is achieved thereby reducing the overall production costs involved.

DESCRIPTION OF THE DRAWINGS

FIG. 4 is a fragmentary elevation view in cross section of an alternative embodiment of the invention;

FIG. 5 is an enlarged fragmentary cross section of the louver and support means illustrated in FIG. 4;

FIG. 6 is a perspective view of the louver hinge which fits into the support bracket illustrated in FIGS. 4 and 5;

FIG. 7 is similar to FIG. 4 and illustrates an alternative air inlet arrangement;

DESCRIPTION OF THE PREFERRED EMBODIMENTS

Figure 1:
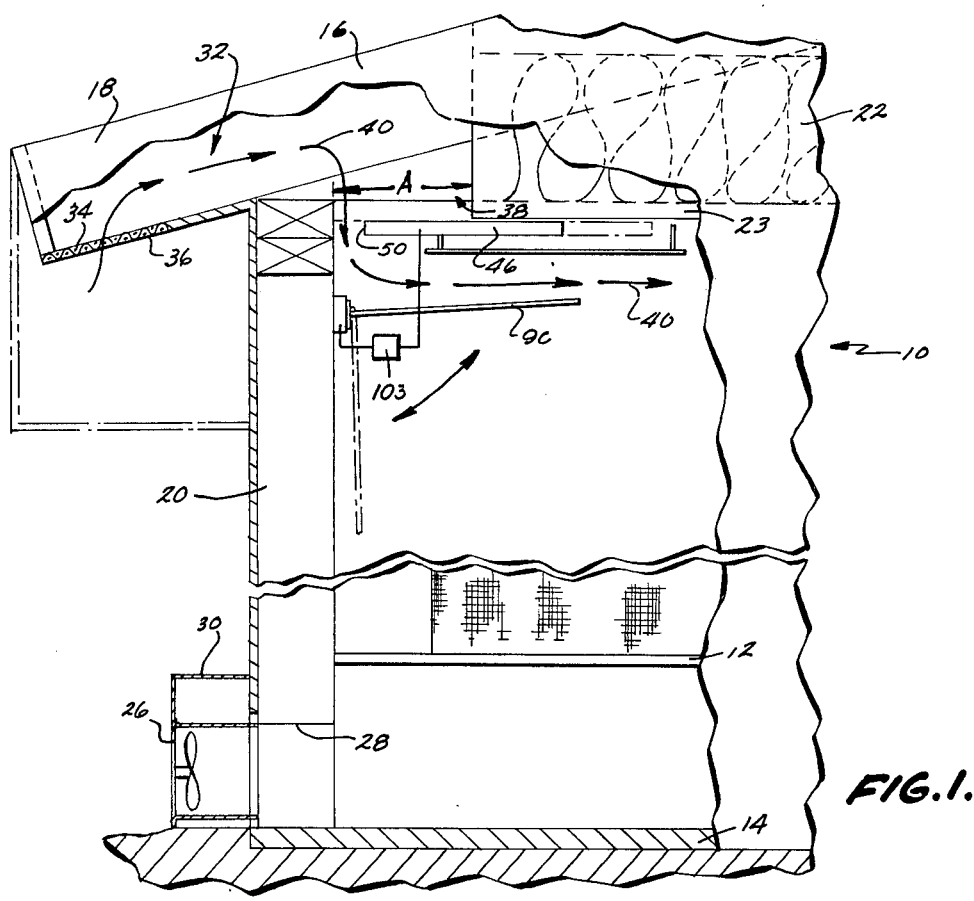
FIG. 1 is a fragmentary elevation view in cross section of a poultry house utilizing the invention.

Referring now to the drawings in detail, building 10 illustrated in FIG. 1 is specifically designed for raising poultry from their first day of existence until they are mature layers or broilers. A typical building of this type generally extends 100 yards in length and is approximately 60 feet wide. Buildings extending longer or shorter exist and it should be appreciated that dimensions in this regard are not critical to the understanding or operation of the invention. A particular object of the invention is to provide a ventilation system which provides an even mixture and distribution of fresh air into and throughout the building. Although the invention is described with particular reference to a poultry house, it will be appreciated that the ventilation system described can be utilized in various different environments.

In a poultry house of the type illustrated in FIG. 1, the poultry are housed in a plurality of cages on a support frame 12 elevated above the floor 14 of the building. The cages 15 are generally comprised of woven wire which permits the free flow of air into and out of each cage. The floor 14 acts as a dung collection area for the poultry droppings which fall through the cage bottoms.

The building is shown having a roof 16 with an overhang 18 and a wall 20. The roof is inclined to facilitate water drainage and includes a layer of insulation 22. The walls 20 also include insulation at 24. While FIG. 1 illustrates the house to be one large animal enclosing room, the building could have more than one room without departing from the concept of the invention.

Stagnant air is removed by one or more exhaust fans 26 positioned at approximately ground level on the outside of the building. An outlet duct 28 through wall 20 draws the stagnant air from beneath the poultry cages. The exhaust fans are arranged in series along the building (usually in banks of six) and each individual fan is operated by a motor 30 which is actuated by a temperature sensing mechanism (not shown) positioned within the building. Each individual fan is generally responsive to an individual sensing mechanism so that when a preselected temperature level is reached, at each particular sensing station (distributed throughout the building) each fan begins operating. A group of fans could be responsive to one sensor however. After the temperature falls to a preselected level, it is shut off. It will be appreciated that not all the fans necessarily operate simultaneously so that the exhaust rate may vary considerably. Preferably, an override is provided in connection with a timer so that in cold weather, the air is intermittently replaced even though the preselected temperature which turns the fans on is never reached. This assures the introduction of fresh air into the building even where cooling is not required. It will be appreciated that heaters are utilized in cold weather to maintain a generally constant temperature level.

The removal of air within building 10 by the exhaust fans 26 reduces the pressure within the building relative to the ambient pressure outside the building. This causes the exhausted air to be replaced with fresh air through appropriate ducts provided between the inside and outside of the building. In a preferred aspect of the invention, the air inlet duct 32 is a continuous opening 34 extending the length of each side wall along the underside of overhang 18. A screen 36 filters the flow of outside air into the duct while preventing objects such as birds from gaining access to the building. Air duct 32 is bounded by the roofing structure and insulation 22 to direct the flow through an opening 38 in ceiling 23. Opening 38 similar to opening 34 likewise extends continuously the length of each side wall 20. Thus, the flow of air from outside the building to within the building follows essentially the direction of arrows 40 along the entire length of each side of building 10.

Opening 38 (FIGS. 1 and 2) has a maximum width indicated at A. A valve 44 is movable across opening 38 between a fully closed position wherein flow through opening 38 is prevented and a fully opened position wherein flow through opening 38 is permitted across its entire width.

Figure 2:
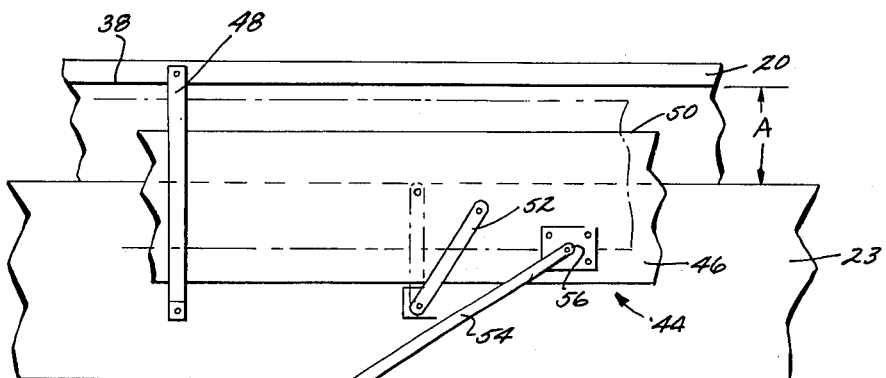
FIG. 2 is a schematic plan view of the valve and control means provided by the invention.
Figure 2:
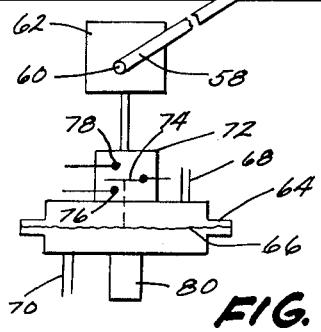
Figure 3:
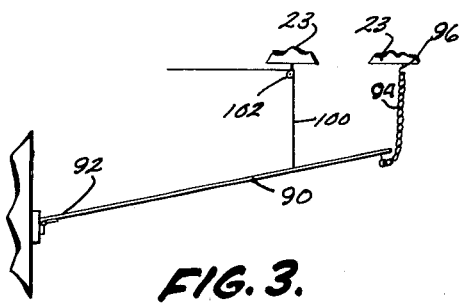
FIG. 3 is an elevation view of the deflection means provided by the invention.

Valve 44 (FIG. 2) is comprised of an elongated flat plate 46 movable relative to and along the plane of ceiling 23 to various positions for hindering the flow through opening 38. In the embodiment of FIGS. 1–3, plate member 46 extends in approximately 100 foot sections and is suspended from ceiling 23 by a plurality of longitudinally spaced brackets 48 (FIG. 2) which suspends plate 46 immediately beneath ceiling 23. Brackets 48 limit the lateral movement from plate 46 between a fully closed position wherein the inner edge 50 of plate 46 is in abutment with side wall 20 of the building. This will effectively prevent any meaningful flow through duct 32 into the building although some leakage may be desired. The end of brackets 48 attached to ceiling 23 prevents plate 46 from moving inwardly past a maximum point wherein the inner edge 50 of plate 46 is removed from hindering any flow through opening 38. In this position, the maximum cross-sectional flow area is available for air flowing through duct 32. A minimum opening may be desired to prevent damage to exhaust fans should they be operating under conditions where no opening would be provided.

Referring to FIG. 2, a pivot arm 52 is pivotally connected at one end to plate 46 and pivotally connected at the other end to ceiling 23 to provide pivotal as well as lateral movement of plate 46 across opening 38. A plurality of pivot arms 52 are provided to stabilize plate member 46 which is supported by brackets 48.

To actuate valve 44, an actuator arm 54 is pivotally anchored at one end 56 to plate member 46. The opposite end 58 is secured to the drive shaft 60 of a motor 62 which when actuated rotates arm 54. The rotation of arm 54 of course acts to move plate member 46 of valve 44 between the opened and closed positions. Rotation in a clockwise direction tends to open valve 44 whereas rotation in the counter-clockwise direction tends to close valve 44. Thus, the cross-sectional area of opening 38 can be varied between a fully closed and fully opened position by the simple actuation of a two-directional motor 62.

In accordance with the invention, valve 44 is actuated to vary opening 38 in accordance with the pressure differential between the outside and inside of the building. Referring yet to FIG. 2, a sensor 64 having a diaphragm 66 detects the variation in pressure differential. Diaphragm 66 is incorporated in a closed system having a vent 68 on one side leading to the atmosphere outside and a vent 70 on the opposite side of the diaphragm 66 opened to the inside of the building. Preferably, vent 70 extends essentially to the center of the building, the pressure at the center of the building being more reflective of the mean pressure throughout. Thus, as the pressure differential between th inside and outside of the building changes, diaphragm 66 will deflect accordingly in one direction or the other. Deflection of diaphragm 66 in one direction actuates a pair of contacts which will cause motor 62 to rotate actuator arm 54 in a clockwise direction to open valve 44 whereas deflection of the diaphragm in the opposite direction causes a set of contacts to close which causes motor 62 to rotate in the counter-clockwise direction to close valve 44.

Referring to FIG. 2, a single pull double throw switch 72 is provided for actuating motor 62. The operation of sensor 64 and switch 72 should be obvious. In the event, that the exhaust fan 26 begins exhausting air from the building, the pressure differential is detected by sensor 64 in that the evacuated air causes the air pressure in building 10 to become reduced thereby urging diaphragm 66 downwardly since the ambient pressure 68 remains essentially constant. The downward deflection of diaphragm 66 causes switch bar 74 to come into contact with contact 76 causing motor 62 to rotate arm 54 in a clockwise direction to open openings 38. As the pressure across diaphragm 66 becomes neutralized, it will return to its neutral sensor position breaking contact between switch 74 and contact 76 to stop motor 62 from running. Should the exhaust demand become greater yet, diaphragm 66 again will deflect downwardly to open valve 44 still further. In the event that the ambient pressure is less than the pressure within the building, diaphragm 66 will deflect upwards until switch 74 is in contact with contact 78. Closing of switch 74 in this fashion will cause motor 62 to operate in a counter-clockwise direction to close valve 44.

The maintenance of a sub-ambient pressure within building 10 relative to the ambient pressure outside tends to cause some minimal flow of ventilating air regardless of the magnitude of air being exhausted by exhaust fans 26. A preselected sub-ambient pressure differential or vacuum of between 0.4 and 0.6 inches of water is preferred for raising poultry. It will be appreciated of course that in the event that the exhaust fans are not running, the sub-ambient pressure differential within the building may be lost since no further air is being removed from the building. In this position of course valve 44 would be in the fully closed position.

An adjustment mechanism 80 is provided on a sensor 64 for preselecting the desired pressure differential. Rotation of adjustment mechanism 80 causes preselected deflection of diaphragm 66 in one direction or the other at which point switch 74 is completely opened.

Referring now to FIG. 3, a deflector 90 is shown for directing the flow of air through opening 38 horizontally out toward the center of building 10 opposed to its otherwise natural movement directly down toward the poultry. It has been found that without some type of deflection means, over ventilation of portions of the poultry is achieved at the expense of less than ideal ventilation of other poultry throughout the building. In both instances, the poultry closest to the air inlet have an over supply of fresh air while the poultry furthest removed from the inlet (those in the center of building 10) receive little if any ventilation. As shown in FIG. 1, deflector 90 is pivotal between a position wherein it generally directs the flow of air through opening 38 in a horizontal direction to a non-deflecting position wherein it is vertically oriented (as shown in phantom). In the vertical position shown, deflector 90 has no effect on the air flow.

The innermost end 92 is preferably anchored to wall 20 for pivotal rotation relative thereto. In the preferred aspects, deflector 90 along with opening 38 extends longitudinally the length of wall 20. A cable 100 anchored at one end to the upper side of deflector 90 is threadable through a pulley 102 anchored to ceiling 23 with the opposite end of cable 100 being connected to a power winch 103 shown schematically in FIG. 1 for rotation to raise or lower deflector 90.

As the velocity of air flowing through opening 38 diminishes, it has been found desirable to elevate deflector 90 toward the position shown in FIGS. 1 and 3 in order to direct the air flow coming in for thorough penetration to the various extremities of the building. On the other hand, as the velocity of air flowing through opening 38 increases, an intermediate setting is selected since the penetration caused by the air flow increases as a result of its velocity. Preferably, the actuation of the power winch 103 shown schematically in FIG. 1 which controls cable 100 is cooperatively associated with the position of valve 44 so that the desired angle of deflection is always maintained in relation to the size of opening A. A chain 94 may be anchored at one end to the underside of deflector 90 with one of its links engaged by a hook 96 anchored to ceiling 23. In this fashion, a minimum deflection angle may be selected regardless of the flow condition.

To summarize briefly, sensor 64 is adjusted to maintain a preselected sub-ambient pressure condition within building 10. In the event that the exhaust fans 26 are not exhausting air to the atmosphere, valve 44 will generally be closed to confine the air within building 10 to maintain the sub-ambient pressure condition. Once one or more of the exhaust fans begin their operation in response to the temperature within the building reaching a preselected level, a demand for replacement air exists causing the pressure within building 10 to decrease. This causes downward deflection of diaphragm 66 closing switch 74 to operate motor 62 for opening valve 44. Depending on the amount of demand, valve 44 will be positioned at some intermediate position between fully opened and fully closed. The inclination of deflector 90 will also be suitably changed to maintain even penetration as the rate of flow changes.

Referring now to the embodiment of FIGS. 4–6, a modified valve and deflector arrangement 110 is provided in the form of a longitudinal louver 112 similar to deflector 90 (FIGS. 1 and 3).

Louver 112 is positioned beneath opening 38 and supported by a bracket 114 and both vary the overall opening for deflecting the inlet air flow through opening 38. Louver 112 extends the entire length of the building although it will be appreciated that it may be conveniently comprised of a plurality of sections to permit ease of handling, shipping and assembly. A plurality of spaced brackets 114 are designed to support the overall weight of louver 112 while at the same time permitting rotation relative thereto so that the deflection angle a can be varied to meet the particular needs directing the flow into the building. The angle of inclination is selected by a calbe 116 secured to the upper end of louver 112. Cable 116 in association with a pully 118 is preferably connected to a power winch (not shown) which automatically adjusts the angle of inclination and effective inlet flow opening as the pressure changes.

Louver 112 is pivotally supported by brackets 114 to provide ventilating flow into building 10 in two essential directions. The first direction is illustrated by arrow 120 which flow is generally directed in a horizontal or cross fashion toward the center of the building so that the ventilating air resulting therefrom is directed evenly over the poultry confined therebeneath. The flow past the upper margin 122 of louver 112 passes through a sub-opening 124 bounded by the upper margin 122 of louver 112 and ceiling 23. The cross-sectional area of this opening can be varied in accordance with the adjustment of cable 116. Likewise, the deflection angle of the air passing through sub-opening 124 is selected in part by the operation of cable 116.

Flow through opening 38 is also directed generally vertically downward in a direction illustrated by arrow 126 to provide down-wash ventilation of the poultry therebeneath. The flow in this case is around the lower margin 128 of louver 112 through a second sub-opening 130 defined by lower margin 128 and wall 20. The cross-sectional area of sub-opening 130 is selected by movement of the lower margin 128 of louver 112 in a lateral direction provided by the unique mounting arrangement of louver 112 relative to bracket 114.

Bracket 114 is characterized in the preferred form by a general overall L-shape with the shorter leg portion 132 being used to anchor the bracket to wall 26. The longer leg portion 134 includes a plurality of laterally spaced openings 136, 138 and 140. Connected to the lower margin 128 of louver 112 is a plurality of tongues 142 spaced longitudinally along the lower margin of louver 112 at locations corresponding to that of brackets 114. Each tongue 142 is comprised of a metal stamping having a first portion 144 secured to one side or the other of louver 112 by a pair of fastener elements 146 (FIG. 6) and a second portion 148 defining the operative tongue. Portion 148 is designed to selectively fit within one of the openings 136, 138 or 140 in order to select the desired magnitude of sub-opening 130. The two portions 144 and 148 of tongue 142 are inclined relative to each other so that the overall general direcion of tongue portion 148 is vertical. The width of openings 136, 138 and 140 exceed that of tongue 142 so that the tongue and louver can pivot relative to the bracket.

OPERATION

Having described the structural details of the embodiment of FIGS. 4–6, the overall operation should be obvious. Upon a given exhaust demand, air flow is developed through inlet duct 32 for entry into building 10 through opening 38. The size of opening 38 is selected to accommodate the largest demand envisioned. The effective size of opening 38 is adjusted by the effect of louver 112 and the sub-openings 124 and 130 provided between louver 112 and the wall 20 and ceiling 23. The flow of air into the building is deflected by louver 112 in a general horizontal direction past the upper margin 122 of louver 112 through sub-opening 124 to develop a cross flow designed to permeate the inner extremeties of the building. At the same time, a portion of the inlet flow is directed through sub-opening 130 past the lower margin 128 of louver 112 to develop down-wash flow over the poultry confined within building 10. The magnitude of the cross section of each sub-opening 124 and 130 is selected in the first case by positioning the upper margin 128 relative to ceiling 23 through the movement of cable 116 while the cross-sectional magnitude of sub-opening 130 is selected by the particular opening 136, 138, 140 in which the lower margin 128 of louver 112 is seated. The angle of inclination of louver 112 is selected primarily by the positioning of the louver through cable 116 although it is in part determined by the particular opening in which the lower margin of louver 112 is seated. Thus, the bracket and cable-pulley arrangement 116, 118 cooperate together.

The embodiment of FIGs. 4–6 thus eliminates the separate valve arrangement 44 illustrated in FIGS. 1 and 2. It will be appreciated that although openings 136, 138 and 140 of bracket 114 are all spaced from wall 20 so that there is a minimum down-wash flow, it would be possible to provide a bracket 114 wherein louver 112 could shut the down-wash flow off completely. The upper edge 122 of louver 112 of course can be brought into position to shut off the horizontal flow completely. Generally, it is desirable to assure a minimum opening to prevent any possible over stress on the exhaust motors.

Referring now to FIG. 7, an alternative embodiment to that illustrated in FIGS. 4–6 is shown. FIG. 7 illustrates a building 10a having an inlet duct 32a directly through side wall 20a. Since the overall operation and arrangement is for the most part identical to that of the embodiment described in FIGS. 4–6, like numerals are utilized for like parts with the suffix a used to illustrate corresponding but modified elements. Inlet duct 32a is comprised of an opening 38a along the upper margin of wall 20a. Thus, the initial direction of flow through inlet opening 38a as depicted by arrows 40a is in a horizontal direction rather than vertical as shown in FIG. 4. The cross flow and down-wash flow however, is identical to that shown in FIG. 4 as is the adjustment and control of the cross flow opening 124 and down-wash opening 130. As a general rule, however, the relative magnitude of these two openings in the embodiment of FIG. 7 will vary somewhat from that of FIG. 4 since the initial thrust of the air flowing into the building is in different directions. Thus, in the embodiment illustrated in FIG. 4, the overall magnitude of the down-wash opening 130 will generally be significantly less than that of the cross flow opening 124 whereas in the embodiment illustrated in FIG. 7, the opposite will tend to occur.

Figure 9:
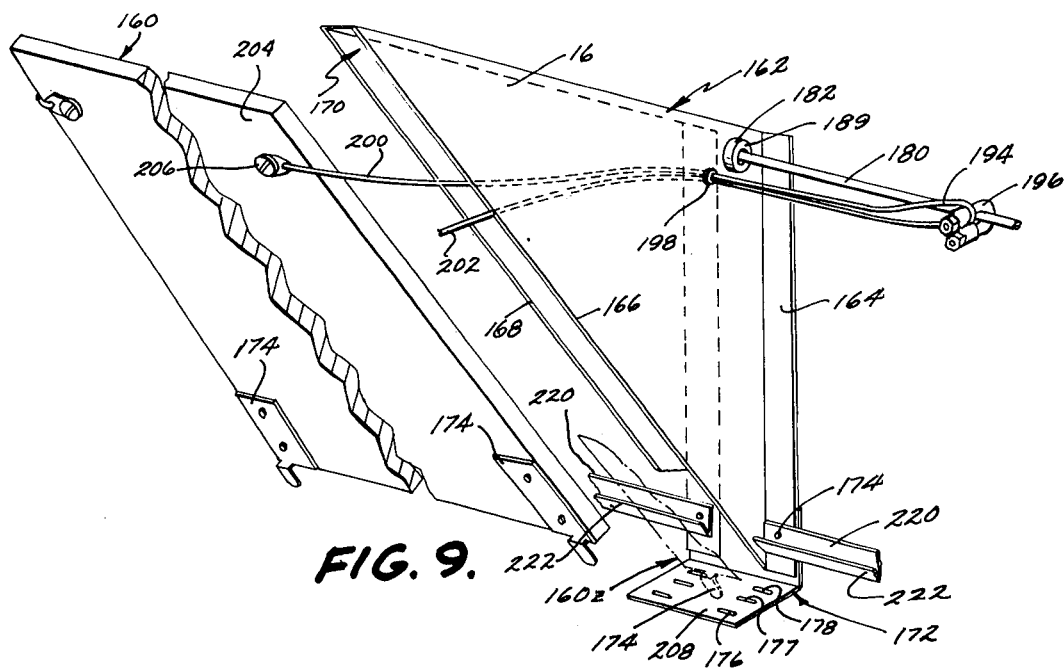
FIG. 9 is an exploded fragmentary view illustrating the operation of the preferred actuating mechanism.
Figure 10:
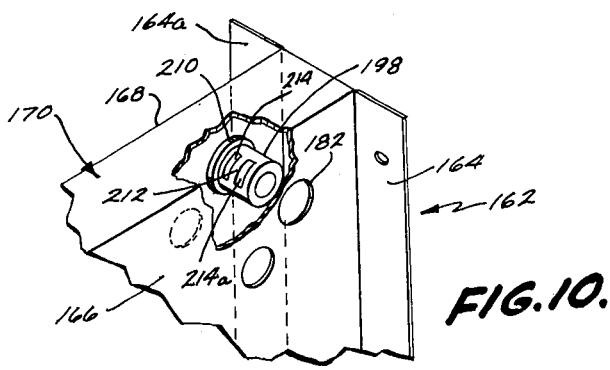
FIG. 10 is an enlarged fragmentary perspective view of the bracket utilized in the preferred embodiment.
Figure 8:
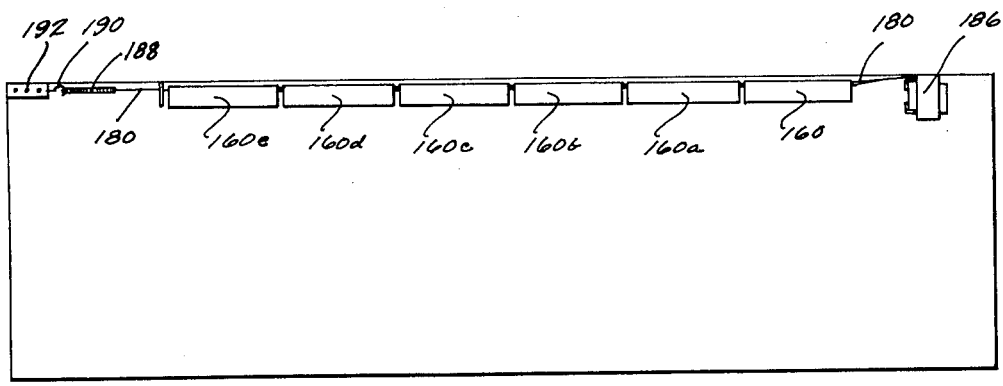
FIG. 8 is an elevation view of yet another alternative embodiment of the invention illustrating the preferred actuating mechanism of the invention.

Referring now to FIGS. 8-10, an alternative embodiment is illustrated showing the preferred valve and deflector arrangement. In this embodiment, a plurality of closely spaced pivotal deflectors 160, 160a, 160b etc. are positioned closely adjacent each other immediately in front of the longitudinally extending inlet opening 38 or 38a as illustrated in FIGS. 4 or 7. In other words, whether the flow of air is introduced through opening 38a (FIG. 7) directly through the side wall or from above through opening 38 through the ceiling, it is effected upon by the plurality of deflectors or louvers 160, 160a etc. FIGS. 9 and 10 show the particular preferred installation of each louver 160. A triangularly shaped bracket 162 having a pair of flanges 164, 164a along one side is mounted to the wall by flanges 164, 164a. The bracket is comprised of identical sides 166 and 168 which are spaced from each other forming an interior spacing 170.

A support bracket 172 somewhat similar to bracket 134 illustrated in FIGS. 4, 5 and 7 is connected to bracket 164 and the wall by nails 174 or other appropriate fasteners. Bracket 172 provides the identical function to that described with regards to brackets 134 illustrated in FIGS. 4, 5 and 7. A plurality of louver spacing brackets 162 are thus anchored to the building wall at arbitrary spacings. In present installations, four foot spacings have proved to work quite well. The individual louvers such as louver 160 is then pivotally anchored to the wall by tongues 174 which correspond generally to tongues 142 described in the preceding embodiment. The tongues are inserted in one of the openings 176, 177, 178 depending on the desired downwash opening.

The louvers such as louver 160 are thus pivotally secured by bracket 172 along their lower margin and depending on the angle of inclination of louver 160, the degree of effective opening through inlet such as inlets 38 or 38a (FIGS. 4 and 7) will be varied.

The preferred mechanism for actuating and maintaining the angle of inclination of louvers 160, 160a etc. is comprised of a cable 180 extending the length of the building through an appropriate opening 182 (FIGS. 9 and 10). A plastic grommet 189 (FIG. 9) avoids abrasive wear as the cable is actuated. The cable is attached at one end to a motor and control mechanism 186 which causes the cable to be longitudinally pulled or released. The opposite end of the cable is attached to a spring 188 secured by a hook 190 to a bracket 192 which provides constant tension on cable 180 so that when it is pulled in a direction to the right (FIG. 8) the spring is stretched so that when cable 180 is released, it will be moved to the left.

The actual movement of each louver is achieved by a plurality of secondary cables one of which is shown in FIG. 9 by the reference numeral 194. Cable 194 is positively secured to cable 180 by a fastener 196 and inserted through a second opening 198 positioned close to opening 182 and threaded through the spacing 170 between each side 166 and 168 of bracket 164. Cable 194 is folded into two portions 200 and 202, with the free end of portion 200 being attached to the upper outer corner 204 of louver 160. Any conventional fastening means such as a threaded fastener 206 will anchor the free end of portion 200 to louver 160. The free end of the other portion 202 is in similar fashion attached to the adjacent louver a portion of which is shown in FIG. 9 as louver 160z. By so mounting each adjacent louver, when cable 180 is moved to the right (FIG. 9), it will cause louver 160 and the remaining louvers 160a, 160b etc. to be moved up towards a closed position which closed position will be achieved when louver 160 is essentially aligned with the bracket 162. Release of cable 180 causes movement in the left direction as viewed from FIG. 9 by reasoning of spring 188. This releases the louvers for opening movement by their gravitational weight. It should be appreciated that the leg portion 208 of bracket 172 is at a vertical inclined angle with respect to the wall so that the weight of each louver will cause it to move towards its open position. Depending on the design critera of the system, the louvers can be allowed to move to essentailly any desired angle depending on the lengths of portions 200 and 202 of cable 194.

FIG. 10 illustrates a special plastic grommet 210 which is preferably mounted within opening 198 to reduce abrasive wear on cable 194. The plastic grommet has a pair of longitudinally spaced circumferential slots 214, 214a separated by a rib 212 so that the portions 200 and 202 of cable 194 are fed separately into the spacing 170 of bracket 162.

Having described the preferred valve and deflector arrangemwent of FIGS. 8-10, its operation should be obvious. Each of the louvers 160, 160a etc. operate and are actuated in unison with each other to vary the degree of inlet opening as well as the deflection angle. It will be appreciated that the larger the opening, generally the lower speed. Hence, as the speed is decreased, the deflection angle is decreased so that the thrust of air flowing through the particular effective opening will continue to penetrate the innermost portion of the building. The motor and control arrangement 186 although not described in detail will be appreciated as being responsive to the differential pressure between the ambient pressure around the building and the interior pressure. The motor is conveniently located on the wall to provide appropriate taps outside and inside. The dimensions of FIG. 8 will be appreciated as being for purposes of illustration only and the continuous inlet opening extends generally the length of the building.

It has been mentioned previously that it is generally desirable to provide a stop of some type to prevent complete closing of the inlet opening to assure against unusual stress or damage to the exhaust fans should they be operating under a condition wherein demand is such that the opening be essentially closed. To assure against complete closing, stop spacers 220 may be anchored to bracket 162 extending between each space bracket 162. A lower angular lip 222 extending at an angle to the wall prevents complete closing of the various louvers 160, 160 etc.

Having described various alternative arrangements, it will be appreciated that the initial set up of the system can be adjusted to a large degree to suit the particular size and dimensional requirements of the building. A smoke gun can be utilized to test the various circulation patterns throughout the building so that the correlation between inlet opening and deflection angle of the louver can be obtained. Once the system is adjusted, a fully automatic system is provided which will automatically adjust to the various pressure differentials as the ambient pressure changes and at all times provide a constant even ventilating penetration throughout the building.

Although several embodiments have been shown and described in detail, it will be obvious to those having ordinary skill in this art that the details of construction of these particular embodiments may be modified in a great many ways without departing from the unique concepts presented. It is therefore intended that the invention is limited only by the scope of the appended claims rather than by particular details of construction shown, except as specifically stated in the claims.

The embodiments of the invention in which an exlusive property or privilege is claimed are defined as follows:

1. A ventilation system for a livestock house having spaced side walls, spaced end walls, a floor and ceiling and livestock cage means elevated above the floor comprising in combination: exhaust fans positioned for removing air from said house and drawing it through said cage means; an inlet duct above said cage means for admitting replacement air into said house and drawing said air through said cage means, said inlet duct including an opening defining a slot means extending lengthwise of at least one of said side and end walls of said house, said slot means being positioned at the transition of said ceiling and said one of said side and end walls; louver means adjacent said slot means and movable between a generally open and closed position to generally permit or block air flow through said opening, said louver means including deflection means adjustable relative said slot means for varying the direction of air flowing into said house; means supporting said louver means in front of said slot means, said louver means including an upper and lower margin, said lower margin being supported along said one of said side and end walls and being pivotal about said lower margin whereby said upper margin is movable into and out of abutment with said transition of said ceiling to vary the amount of air flow opening through said slot means providing automatic adjustment of the deflection of air flow into said house relative to the size of air flow opening; sensing means for sensing the pressure differential between the inside and outside of said house; and actuating means responsive to changes in said pressure differential to open or close said louver means and adjust said deflection means to maintain a preselected constant pressure differential and provide continuous and even distribution of air circulation through said house.

2. The apparatus according to claim 1 wherein said actuating means is a motor-driven cable means which varies the inlet opening and deflection angle simultaneously by causing pivotal movement of said louver means in response to changes in the pressure differential between said room and outside said building.

3. Apparatus for controlling and circulating the flow of ventilating air through an enclosed room in a building comprising in combination: air inlet and outlet means from outside said buildings into said room, said inlet means comprising an opening located at the transition of one of the walls and ceiling of the room and extending substantially the entire length of at least one side of said room; exhaust means causing air outside said building to flow into said room through said inlet means and out said outlet means; valve and deflection louver means associated with said opening and extending in front thereof, said louver means being movable relative said opening between generally open and generally closed positions to admit or prevent flow through said inlet means and to cause even distribution of air flowing through said inlet means through said room, said louver means being positioned in close proximity to the ceiling of said room and the lower margin being positioned in close proximity to the said wall of said room when in said generally closed position to prevent flow of air through said opening; bracket means anchored to the said wall of said room for supporting said valve and deflection louver means, the lower margin of said louver means being supported by said bracket means for positioning at various selected spacing from said wall of said room to adjust the down-wash flow of air from said opening vertically generally downwardly along the said wall of said room, said support means supporting said louver means for pivotal movement relative said opening, said louver means being pivotable to varying angles of incline relative the plane of said opening to vary both the effective flow of air through said opening and the angle of deflection of air into said room; sensing means for sensing the pressure differential between the ambient pressure outside said building and the pressure within said room; and control means responsive to said sensing means for actuating said valve and deflection louver means to maintain a preselected pressure differential, said control means adjusting said valve and deflection louver means to provide continuous and even distribution of air circulation through said room.

4. A ventilation system for an animal house having spaced side walls, spaced end walls, a floor and ceiling comprising in combination: an air outlet duct; exhaust means for removing air from said house, an inlet duct for admitting replacement air into said house, said inlet duct including an opening in at least one of said walls; louver means associated with said inlet duct and movable between a generally open and closed position to generally permit or block air flow through said opening; said louver means including deflection means adjustable relative said inlet duct for even distribution of air flowing into said housing through said inlet duct; actuating means for operating said louver means; support means for said louver means comprising a plurality of brackets anchored to said one or more walls, said louver means being supported for pivotal movement relative said inlet duct and being pivotal to varying angles of incline relative the plane of said inlet duct to vary both the effective flow of air through said inlet duct and the angle of deflection of air past said louver means into said house, said louver means comprising a plurality of longitudinally extending plates supported by said brackets, each of said plates including a tongue means at each end thereof engageable with said brackets whereby said brackets support said plates and said plates are pivotal relative thereto so that the upper margin of said plates can be pivoted into close proximity to the ceiling of said housing, said opening being positioned at the transition of said one wall and ceiling, whereby the pivoting of said plates defines the effective inlet opening into said housing, said actuating means including a cable means which simultaneously pivots each of said plates in unison together so that the effective inlet opening is varied and the inlet deflection angle is simultaneously adjusted relative the pressure differential between the inside and outside of said house, and sensing means for sensing the pressure differential between the inside and outside of said house, said sensing means controlling the operation of said actuating means to open or close said louver means and adjust said deflection means to maintain a preselected constant pressure differential and provide continuous and even distribution of air circulation through said house.

5. The system according to claim 4 wherein said cable means includes a cable extending the length of said one wall, said cable extending through said brackets and being anchored at one end to a spring means anchored to said house and at the other end to a drum, said cable means further including secondary cables anchored to said first cable and extending through said brackets for attachment to said plates whereby rotation of said drum in one direction causes upward pivotal rotation of said plates to reduce the effective flow opening through said inlet duct opening and rotation of said drum in the other direction causing said plates to pivot downwardly to enlarge the effective flow opening through said inlet duct.

6. A ventilation system for a poultry house having spaced side walls, spaced end walls, a floor and ceiling and poultry cage means elevated above the floor comprising in combination: exhaust fans positioned beneath said cage means for removing air from said house; an inlet duct above said cage means for admitting replacement air into said house and drawing said air through said cage means, said inlet duct including an opening defining a slot means extending generally the length of at least one of said side and end walls of said house, said slot means being positioned at the transition of said ceiling and said one of said side and end walls; louver means adjacent said slot means and movable between a generally open and closed position to generally permit or block air flow through said opening, said louver means including deflection means adjustable relative said slot means for varying the direction of air flowing into said house; means supporting said louver means in front of said slot means, said louver means including an upper and lower margin, said lower margin being supported along said one of said side and end walls and positionable at selected spacings from said one of said side and end wall to vary the down-wash flow of air from said slot means vertically generally downwardly along said one of said side and end wall and further being pivotal about said lower margin whereby said upper margin is movable into and out of abutment with said ceiling to vary the amount of air flow opening between the ceiling and said upper margin the angle of said louver means relative said ceiling providing automatic adjustment of the deflection of air flow into said house relative the size of air flow opening; sensing means for sensing the pressure differential between the inside and outside of said house; and actuating means responsive to changes in said pressure differential to open or close said louver means and adjust said deflection means to maintain a preselected constant pressure differential and provide continuous and even distribution of air circulation through said house.

7. A ventilation system for a livestock house having opposite spaced side walls, opposite spaced end walls, a floor and ceiling and livestock cage means elevated above the floor comprising in combination: exhaust fans positioned beneath said cage means along the proximity of the floor for removing air from said house; an inlet duct above said cage means for admitting replacement air into said house and drawing said air through said cage means, said inlet duct including opposed openings defining opposed slot means extending generally the length of one of said opposed side and end walls of said house, said slot means being positioned at the transition of said ceiling and said one of said opposed side and end walls; louver means adjacent said slot means and movable between a generally open and closed position to generally permit or block air flow through said opening, said louver means further defining deflection means being adjustable relative said slot means for varying the direction of air flowing into said house; means supporting said louver means in front of said slot means said louver means including an upper and lower margin, said lower margin being supported along said one of said side and end walls and being pivotal about said lower margin whereby said upper margin is movable into and out of abutment with said transition of said ceiling to vary the amount of air flow opening through said slot means providing automatic adjustment of the deflection of air flow into said house relative the size of air flow opening; sensing means for sensing the pressure; differential between the inside and outside of said house; and actuating means responsive to changes in said pressure differential to open or close said louver means and adjust said deflection means to maintain a preselected constant pressure differential and provide continuous and even distribution of air circulation through said house.

8. The system according to claim 7 wherein said exhaust means are positioned in said one of said opposed side and end walls associated with said slot means.

* * * * *